United States Patent
Dorsey

(10) Patent No.: US 8,780,271 B2
(45) Date of Patent: *Jul. 15, 2014

(54) BI-MODAL SWITCHING FOR CONTROLLING DIGITAL TV APPLICATIONS ON HAND-HELD VIDEO DEVICES

(75) Inventor: Eric Andrew Dorsey, Palo Alto, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1353 days.

This patent is subject to a terminal disclaimer.

(21) Appl. No.: 11/795,537

(22) PCT Filed: Jan. 20, 2005

(86) PCT No.: PCT/US2005/002427
§ 371 (c)(1),
(2), (4) Date: Jul. 18, 2007

(87) PCT Pub. No.: WO2006/078254
PCT Pub. Date: Jul. 27, 2006

(65) Prior Publication Data
US 2009/0027565 A1    Jan. 29, 2009

(51) Int. Cl.
*H04N 5/445* (2011.01)
*H04N 5/44* (2011.01)

(52) U.S. Cl.
CPC .............. *H04N 5/4403* (2013.01); *H04N 5/44* (2013.01); *H04N 2005/4416* (2013.01)
USPC ........... 348/564; 348/553; 348/734; 715/773; 715/765

(58) Field of Classification Search
USPC .............. 348/838, 734, 211.99, 211.1, 211.2, 348/563, 564, 569, 552, 553, 554; 715/773, 715/765
See application file for complete search history.

(56) References Cited

U.S. PATENT DOCUMENTS

| | | | |
|---|---|---|---|
| 5,157,496 A | 10/1992 | Kurosawa | |
| 5,894,276 A | 4/1999 | Altidor et al. | |
| 5,950,809 A * | 9/1999 | Andre | 200/314 |
| 6,310,609 B1 | 10/2001 | Morgenthaler | |
| 6,348,932 B1 | 2/2002 | Nishikawa et al. | |

(Continued)

FOREIGN PATENT DOCUMENTS

| | | |
|---|---|---|
| CN | 1346569 | 4/2002 |
| CN | 1480825 | 3/2004 |

(Continued)

OTHER PUBLICATIONS

Search Report Dated Nov. 21, 2005.

(Continued)

*Primary Examiner* — Michael Lee
(74) *Attorney, Agent, or Firm* — Robert D. Shedd; Reitseng Lin

(57) ABSTRACT

A portable digital television (DTV) comprises a processor and a navigational button arrangement. The processor of the portable DTV controls the navigational button arrangement to have at least a bi-modal operation. In one mode of operation, the navigational button arrangement provides a navigational interface to a user and, in another mode of operation, the navigational button arrangement provides an interactive application interface to the user.

20 Claims, 11 Drawing Sheets

(56) References Cited

U.S. PATENT DOCUMENTS

| | | |
|---|---|---|
| 6,519,009 B1 | 2/2003 | Hanaya et al. |
| 6,629,077 B1 | 9/2003 | Arling et al. |
| 6,761,462 B2 | 7/2004 | Yoshida |
| 6,771,938 B2 | 8/2004 | Lustila et al. |
| D497,618 S | 10/2004 | Andre et al. |
| 6,813,147 B2 | 11/2004 | Jeong |
| 6,906,701 B1 | 6/2005 | Oueslati et al. |
| 7,461,350 B2 | 12/2008 | Salo et al. |
| 2002/0024505 A1 | 2/2002 | Eftekhari |
| 2002/0025829 A1* | 2/2002 | Kitatani ............... 455/550 |
| 2002/0168947 A1* | 11/2002 | Lemley ................ 455/90 |
| 2002/0184626 A1 | 12/2002 | Darbee et al. |
| 2003/0034878 A1 | 2/2003 | Hull et al. |
| 2003/0079227 A1 | 4/2003 | Knowles et al. |
| 2003/0093812 A1 | 5/2003 | Chang et al. |
| 2004/0021694 A1 | 2/2004 | Doar |
| 2004/0022047 A1* | 2/2004 | Okayasu ............... 362/23 |
| 2004/0046741 A1 | 3/2004 | Low et al. |
| 2004/0055446 A1 | 3/2004 | Robbin et al. |
| 2004/0056985 A1* | 3/2004 | Seong ................... 348/838 |
| 2004/0068740 A1 | 4/2004 | Fukuda et al. |
| 2004/0090556 A1 | 5/2004 | Kamieniecki et al. |
| 2004/0107444 A1* | 6/2004 | Moon .................... 725/105 |
| 2004/0119601 A1 | 6/2004 | Colorado et al. |
| 2004/0125078 A1 | 7/2004 | Nishimori et al. |
| 2004/0158859 A1 | 8/2004 | Aoyama et al. |
| 2004/0192255 A1 | 9/2004 | Nakamura |
| 2004/0224638 A1 | 11/2004 | Fadell et al. |
| 2004/0268391 A1* | 12/2004 | Clercq et al. ................ 725/37 |
| 2005/0018073 A1 | 1/2005 | Pilu |
| 2005/0088315 A1* | 4/2005 | Klein et al. ............. 340/825.69 |
| 2005/0141065 A1 | 6/2005 | Masamoto |
| 2005/0285547 A1 | 12/2005 | Piepgras et al. |
| 2006/0136773 A1* | 6/2006 | Kespohl et al. ................ 714/2 |
| 2006/0149809 A1* | 7/2006 | Salo et al. .................. 709/203 |

FOREIGN PATENT DOCUMENTS

| | | | |
|---|---|---|---|
| CN | 1480825 A | 3/2004 | |
| EP | 0849948 A2 | 6/1998 | |
| EP | 1351217 A1 | 10/2003 | |
| EP | 1 463 078 A2 | 9/2004 | |
| GB | 2 407 186 A | 4/2005 | |
| JP | 10-112886 * | 4/1998 | ............... H04Q 9/00 |
| JP | 10-142651 | 5/1998 | |
| JP | 2001-333291 | 11/2001 | |
| JP | 2001331253 | 11/2001 | |
| JP | 2001-359179 | 12/2001 | |
| JP | 2003-131783 | 5/2003 | |
| JP | 2004038897 | 2/2004 | |
| JP | 2004-228724 | 8/2004 | |
| JP | 2004-295355 | 10/2004 | |
| JP | 2004-336489 | 11/2004 | |
| JP | 2005-6144 | 1/2005 | |
| JP | 2005-45350 | 2/2005 | |
| JP | 2005-134998 | 5/2005 | |
| KR | 2003-0060531 | 7/2003 | |
| KR | 10-2005-0016149 | 2/2005 | |
| WO | WO97/49044 | 12/1997 | |
| WO | WO 00/52930 | 9/2000 | |
| WO | 00/78050 A1 | 12/2000 | |
| WO | WO00/78050 A1 | 12/2000 | |
| WO | WO01/17255 A1 | 3/2001 | |
| WO | 02/03187 A2 | 1/2002 | |
| WO | WO2005069609 | 7/2005 | |

OTHER PUBLICATIONS

Non-final Office Action dated Jul. 13, 2011, 28 pgs.
Non-final Office Action dated Jan. 16, 2012, 31 pgs.
Office Action for U.S. Appl. No. 11/991,199 dated Jun. 8, 2012.
Office Action for U.S. Appl. No. 11/991,199 dated Jul. 18, 2012.
Office Action for U.S. Appl. No. 11/991,199 dated Dec. 13, 2013.

* cited by examiner

Navigational Mode (white colors)

Chromatic Mode (non-white colors)

BI-MODAL SWITCHING FOR CONTROLLING DIGITAL TV APPLICATIONS ON HAND-HELD VIDEO DEVICES

This application claims the benefit, under 35 U.S.C. §365 of International Application PCT/US2005/02427, filed Jan. 20, 2005, which was published in accordance with PCT Article 21(2) on Jul. 27, 2006 in English.

BACKGROUND OF THE INVENTION

The present invention generally relates to user interfaces and, more particularly, to a user interface for a hand-held video device.

In a television system conforming to the Digital Video Broadcasting (DVB-T) Standard found in Europe (e.g., see ETSI EN 300 744 and other associated documents) interactive applications may be present. In this regard, a remote control for a digital television (DTV) typically comprises a set of navigation keys and a set of function keys. The set of navigation keys, or buttons, are used to traverse an electronic programming guide (EPG) and/or a menu tree displayed on the DTV and typically comprise five buttons representing such common operations as "up", "down", "right", "left" and "select". In comparison, the function keys are used for the interactive application and typically comprise at least four buttons, each button associated with a particular color. For example, one button is colored red, another green, a third blue and the fourth yellow. (It should be noted that a fifth button is reserved for future use and is denoted by the color purple.) As such, the interactive application may provide "soft labels" on the picture displayed on the DTV, each label textually describing a different function and having one of the four colors. For example, an interactive application may cause to be displayed a soft label with the text "go back" and having a red background. A user would then know that pressing the red-colored function key on the remote control would correspond to performing the "go back function" for the interactive application.

SUMMARY OF THE INVENTION

I have observed that the use of a set of navigation keys and a set of function keys in a DTV environment presents a problem in the construction of a portable DTV that supports interactive applications. In particular, the portable DTV must either provide enough physical space for at least ten buttons somewhere on the portable DTV (five buttons for the navigation interface and five buttons for the interactive application interface), or require packaging of a remote control (with the above-noted requisite number of buttons) along with the portable DTV. Therefore, and in accordance with the principles of the invention, a navigational button arrangement has at least a bi-modal operation. In one mode of operation, the navigational button arrangement provides a navigational mode for traversing a guide and/or menu presented on the DTV and, in another mode of operation, the navigational button arrangement provides an interactive application mode for interacting with a DTV application presented to the user. Thus, the portable DTV utilizes five buttons to provide both the navigational interface and the interactive application interface instead of the above-noted ten buttons.

In an embodiment of the invention, a portable DTV comprises a processor, a display and a user interface. The latter comprises a navigational button arrangement of five buttons having bi-modal operation, five multi-color light-emitting diodes (LEDs) (one LED associated with each of the five buttons of the navigational button arrangement) and a mode button. The mode button enables a user to cause the processor to select either a navigational mode of operation or an interactive application mode of operation for the navigational button arrangement. In the navigational mode of operation, each of the five buttons provides a navigational interface to the user for traversing a guide and/or menu presented on the DTV and the associated LEDs each provide a white light to signify that the navigational mode is selected. In the interactive mode of operation, at least one of the five buttons provides an interactive application interface to the user and the associated LED provides a different color light to signify that the interactive application mode is selected. In particular, the colors in the interactive mode of application are: red, green, blue, yellow and purple. In addition, the colors in the interactive mode correspond to the colors representative of a particular interactive function that are displayed on the display of the portable DTV by an interactive application.

DETAILED DESCRIPTION

Other than the inventive concept, the elements shown in the figures are well known and will not be described in detail. Also, familiarity with digital television-based systems is assumed and is not described in detail herein. For example, other than the inventive concept, digital-TV bearing modulated signals, symbol constellations, carrier recovery, interpolation, phase-locked loops (PLLs), a radio-frequency (rf) front-end, or receiver section, such as a low noise block downconverter, formatting and encoding methods (such as Moving Picture Expert Group (MPEG)-2 Systems Standard (ISO/IEC 13818-1)) for generating transport bit streams, decoding methods such as log-likelihood ratios, soft-input-soft-output (SISO) decoders, Viterbi decoders, stored-program controlled processors and buttons for providing a user interface, are well-known and not described herein. In addition, the inventive concept may be implemented using conventional programming techniques, which, as such, will not be described herein. Finally, like-numbers on the figures represent similar elements and at least some of the figures simplify the processing representation and are not drawn to scale.

Figure 1:
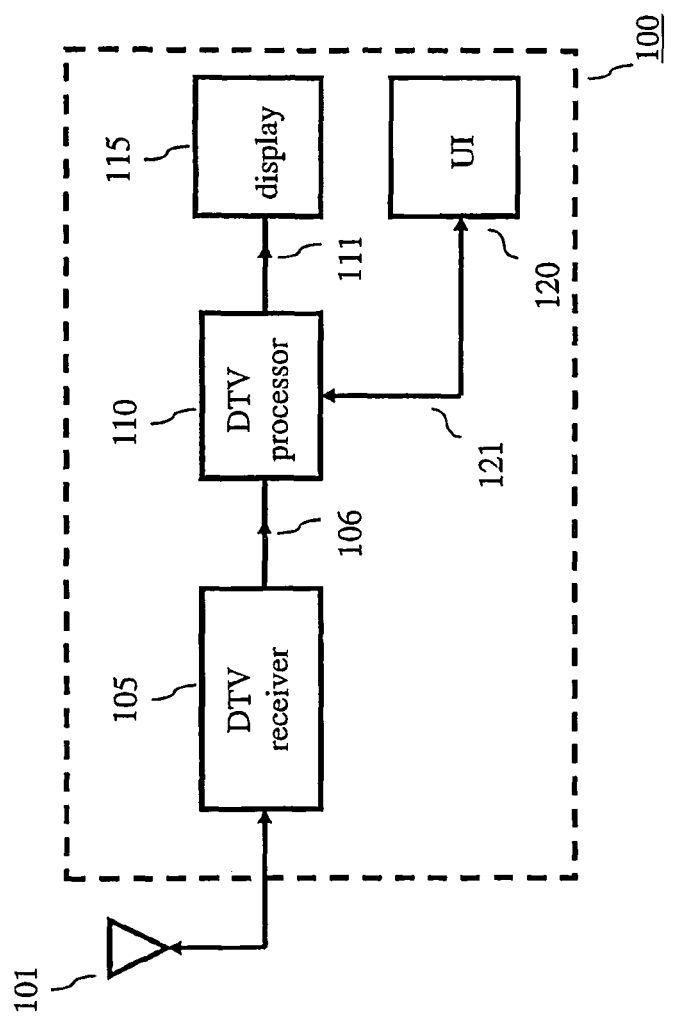
FIG. 1 shows an illustrative portable DTV embodying the principles of the invention.

An illustrative portable DTV 100 in accordance with the principles of the invention is shown in FIG. 1. Portable DTV 100 comprises antenna 101, DTV receiver 105, DTV processor 110, display 115 and user interface (UI) 120. Illustratively, portable DTV 100 conforms to the earlier-mentioned European DVB-T standard. In this regard, DTV receiver 105 receives a DTV signal, via antenna 101. DTV receiver 105 processes the received signal to provide a down-converted signal 106 to DTV processor 110. The latter further processes the down-converted signal to recover therefrom a digital service such as a digital video signal 111 for application to display 115 for viewing thereon by a user. Portable DTV 100 is controlled by UI 120, via signaling path 121, which provides the ability for a user to, e.g., turn-on and off the device, select channels, adjust volume, traverse a graphical user interface (GUI) as represented by an electronic program guide (EPG) and/or a menu (such as for setting DTV parameters (e.g., video, audio, etc.)) presented on display 115 and provide interactive application data, etc. With regard to interactive application data, DTV processor 110 includes a memory (not shown) for storing therein an interactive application program downloaded via DTV receiver 105. Upon execution by DTV processor 110, the interactive application program provides an interactive application to the user. Known interactive applications are, e.g., weather, news, traffic and games (e.g., Tetris). An interactive application may be associated with a specific channel (e.g., a game channel) or with a program that is currently being viewed. For example, a sports program may also display a colored function key on the screen that, when selected by the user, provides, e.g., additional team information. It should be noted that DTV processor 110 is representative of a processing function and may be implemented in one, or more, stored-program controlled processors (e.g., a microprocessor).

Figure 2:
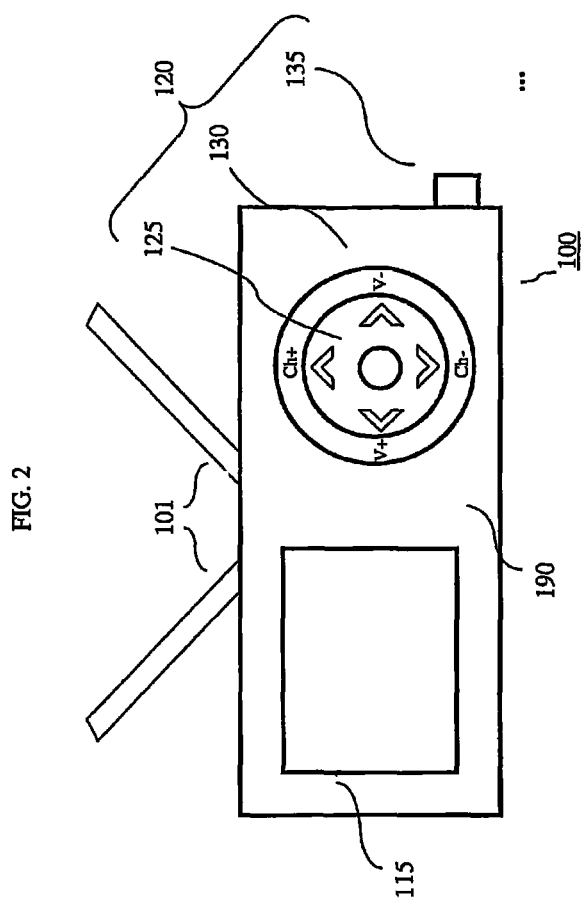
FIG. 2 shows an illustrative front view of a portable DTV embodying the principles of the invention.

Turning now to FIG. 2, an illustrative front view of portable DTV 100 is shown. It should be noted that this view is only illustrative, is not to scale, and is merely used to highlight the principles of the invention. Portable DTV 100 is contained within a housing 190. As can be observed from FIG. 2, housing 190 provides support for display 115, user interface 120 and antenna 101. User interface 120 comprises at least a navigational button arrangement 125, a button arrangement 130 and a mode button 135. Although not necessary for the inventive concept, button arrangement 130 illustratively provides the ability for a user to change channels and adjust volume. This is shown in FIG. 2 by the illustrative use of the labels "Ch+" and "Ch-" as indicating the buttons used for incrementing and decrementing a current channel selection; and by the illustrative use of the labels "V+" and "V-" as indicating the buttons used for increasing and decreasing a current volume setting. Likewise, other buttons may be present, e.g., a power button, but these are also not relative to the inventive concept. In accordance with the principles of the invention, navigational button arrangement 125 has at least two modes of operation: a navigational mode of operation and an interactive application mode of operation (also referred to herein as a chromatic mode of operation).

Figure 3:
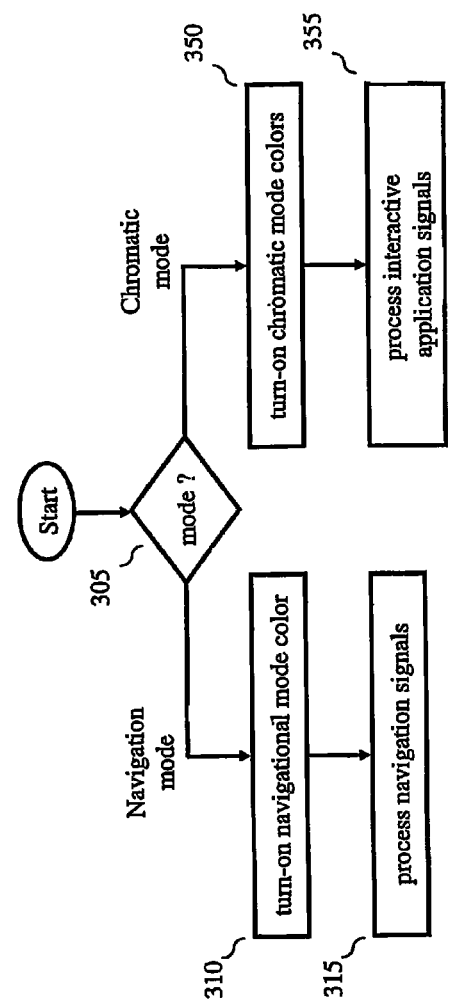
FIG. 3 shows an illustrative flow chart in accordance with the principles of the invention.

Reference should now be made to FIG. 3, which illustrates an illustrative flow chart in accordance with the principles of the invention for providing a navigational button arrangement with at least two modes of operation. In step 305, DTV processor 110 sets the mode of portable DTV 100. For example, DTV processor 110 may use mode button 135 of FIG. 2 for setting the mode. In particular, mode button 135 provides an indication of at least two states. One state is associated with the navigational mode of operation and the other state is associated with the interactive mode of operation. DTV processor 110 will switch modes simply be detecting the current state of button 135. As such, a user can cause DTV processor 110 to switch the modes by simply pressing mode button 135. When the navigational mode is set, DTV processor 110 executes steps 310 and 315. In step 310, DTV processor 110 turns on the navigational mode color (described further below) and, in step 315, processes any signals from navigational button arrangement 125 as navigation signals. On the other hand, when the interactive application mode is set, DTV processor 110 executes steps 350 and 355. In step 350, DTV processor 110 turns on the interactive application mode colors (also referred to herein as the chromatic mode colors) (described below) and, in step 355, processes any signals from navigational button arrangement 125 as interactive application signals and passes them to the particular interactive application program. Thus, portable DTV 100 utilizes five buttons to provide both the navigational interface and the interactive application interface instead of the earlier-noted ten buttons.

Figure 4:
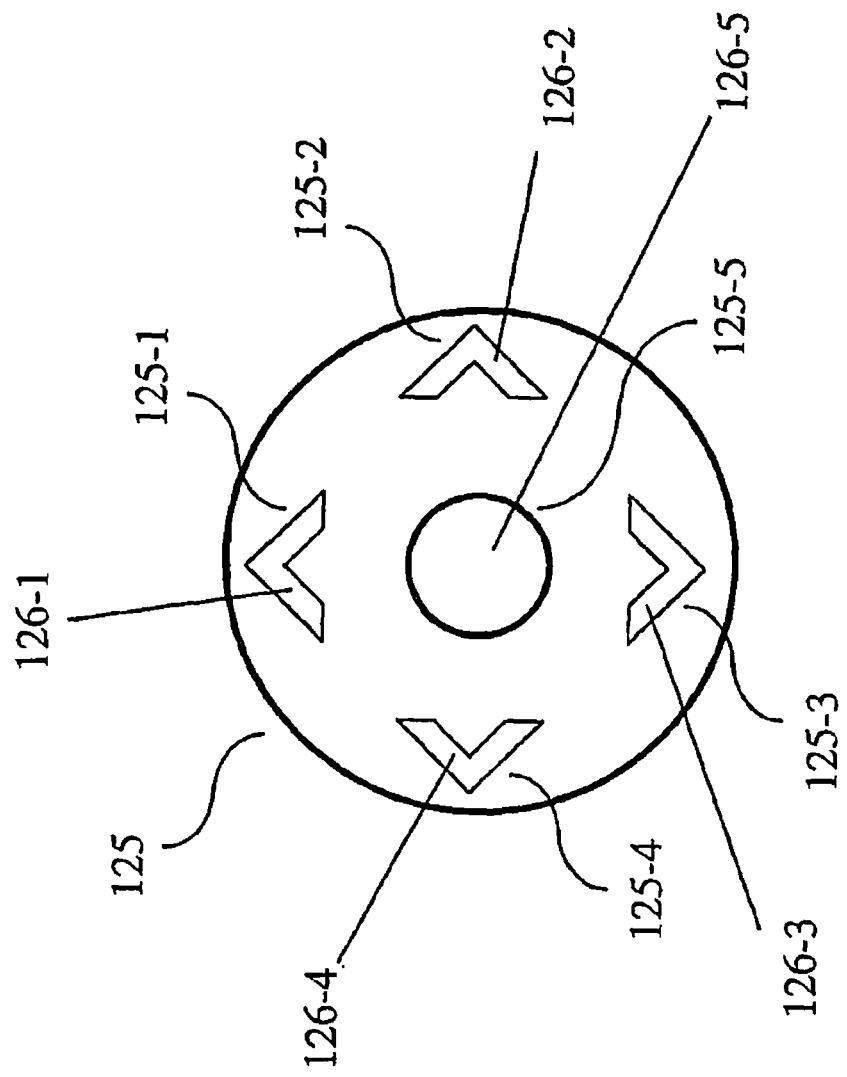
FIG. 4 shows an illustration of navigational button arrangement 125 in the navigational mode in accordance with the principles of the invention.

The navigational mode for navigational button arrangement 125 is illustrated in FIG. 4. Portions of navigational button arrangement 125 comprise in effect five buttons: an up button, a right button, a down button, a left button and a select button. These are illustrated in FIG. 4 by corresponding portions 125-1, 125-2, 125-3, 125-4 and 125-5 of navigational button arrangement 125. These portions of navigational button arrangement 125 are also referred to herein as up button 125-1, right button 125-2, down button 125-3, left button 125-4 and select button 125-5. Each button portion comprises at least a partially optically transparent portion, as represented by optical portions 126-1, 126-2, 126-3, 126-4 and 126-5. For the purposes of this description the outer optically transparent portions (126-1, 126-2, 126-3 and 126-4) are in the shape of illustrative direction symbols ($\wedge$, $\vee$, >, <) but the inventive concept is not so limited.

Figure 5:
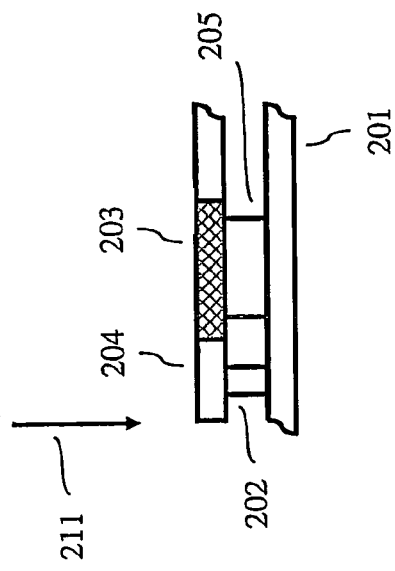
FIG. 5 shows an illustrative portion of navigational button arrangement 125.

Turning briefly to FIG. 5, a simplified form of an illustrative block diagram is shown for a portion (e.g., one button, e.g., button 125-4) of navigational button arrangement 125. Navigational button arrangement 125 comprises a circuit board 201, post element 202, optical element 205 and a cover plate 204 having at least a partially optically transparent portion 203 for emitting light from optical element 205 (e.g., corresponding to optically transparent portion 126-4 of FIG. 4). Arranged on both circuit board 201 and post element 202 are corresponding electrically conductive elements (not shown) such that when cover plate 205 is depressed in the direction of arrow 202, the electrically conductive element of post element 202 makes contact with the corresponding electrically conductive element of circuit board 201 to generate an electrical signal to DTV processor 110 via signaling path 121 of FIG. 1 (not shown in FIG. 5). In addition, circuit board 201 conveys electrical signals to optical element 205 for causing optical element 205 to generate light for transmission through optically transparent portion 203. Optical element 205 is controlled via signaling path 121 of FIG. 1 (not shown in FIG. 5) by DTV processor 110. In accordance with the principles of the invention, optical element 205 is a multi-color light emitting diode (LED) and is capable of providing light in at least two types of colors. For example, optical element 205 may be a bi-color LED, a tri-color LED, etc., as known in the art. For the purposes of this description it is assumed that at least one of the colors capable of being generated by optical element 205 is white.

Returning to FIG. 4, and as noted above, this figure is representative of the navigational mode of operation. In particular, each optical element of navigational button arrangement 125 is controlled to provide a white color (step 310 of FIG. 3). This is illustrated in FIG. 4 by the lack of a "fill" pattern in each of the optically transparent portions 126-1, 126-2, 126-3, 126-4 and 126-5. As such, the presence of white light associated with all of the buttons of navigational button arrangement 125 is indicative to a user that the navigational button arrangement is in the navigational mode and can be used to, e.g., change channels, adjust volume, etc.

Figure 6:
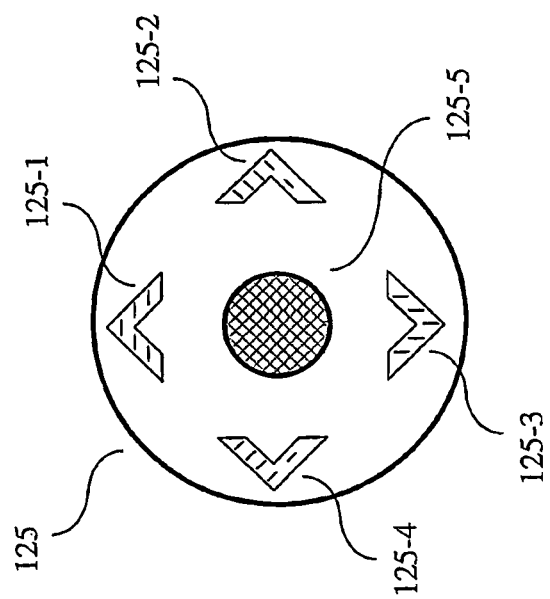
FIGS. 6, 7 and 8 show illustrations of the navigational button arrangement 125 in the interactive application mode in accordance with the principles of the invention.

Referring now to FIG. 6, the interactive application mode is illustrated. A visual comparison of FIGS. 4 and 6 shows that, in FIG. 6, patterns now exist in the optically transparent portions 126-1, 126-2, 126-3, 126-4 and 126-5. These patterns are used herein to represent a color of light other than white. In particular, each optical element of navigational button arrangement 125 is controlled to provide a different color (step 350 of FIG. 3). Illustratively, the horizontal dash "-" associated with up button 125-1 is representative of the color red; the vertical dash "|" associated with down button 125-3 is representative of the color blue, the forward slash "/" associated with right button 125-2 is representative of the color yellow, the backward slash "\" associated with left button 125-4 is representative of the color green and the cross-hatch pattern associated with select button 125-5 is representative of the color purple. (As noted above, the color purple is a reserved color for future use by interactive applications. As such, the color associated with select button 125-5 may also be kept as white, or the associated optical element may be turned off so that no light is emitted, in accordance with the principles of the invention.)

Figure 7:
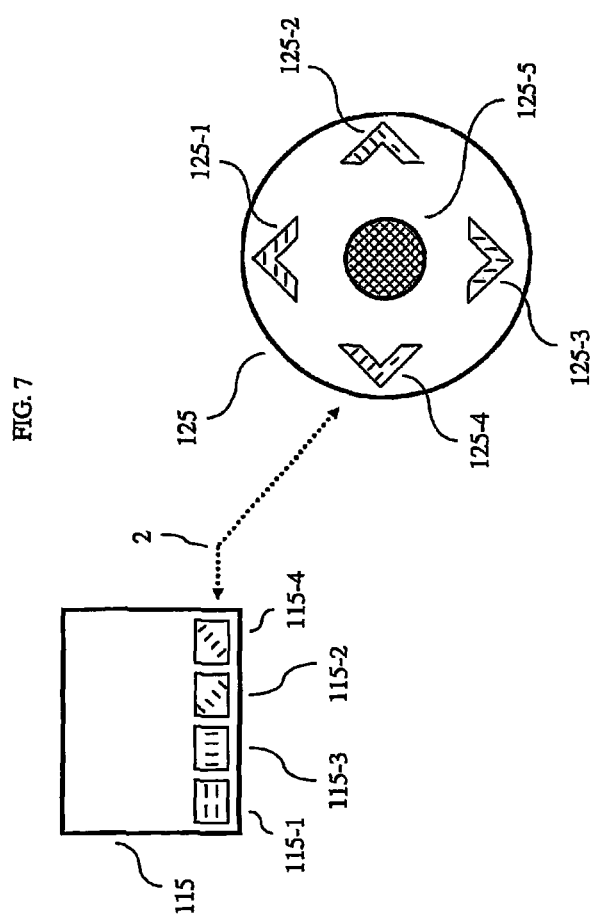

The operation of the interactive application mode is further illustrated in FIG. 7. As shown in FIG. 7, navigational button arrangement 125 is in the interactive mode as represented by the above-described "fill" characters. Also shown in FIG. 7 is an illustration of a portion of an image present on display 115 during the application mode. In particular, portions of display 115 represent functions that a user may select. (Not shown in FIG. 7 are the corresponding text labels associated with each of the functions a user may select.) Bach function is denoted by a particular color as represented by a particular "fill" character. For example, the horizontal dash "-" associated with display portion 115-1 is representative of the color red; the vertical dash "|" associated with display portion 115-3 is representative of the color blue, the forward slash "/" associated with display portion 115-2 is representative of the color yellow, and the backward slash "\" associated with display portion 115-4 is representative of the color green. In accordance with the principles of the invention, in the interactive application mode there is a correspondence between the colors shown on display 115 and the colors emitted by the optical elements of navigational button arrangement 125. Thus, when colors other than white appear next to a button, the user can detect that portable DTV 100 is in the interactive application mode and that use of the button associated with a particular color will result in that function being selected for the interactive application. For example, if display portion 115-1 also displayed a text label (not shown) entitled "go back," then the user would simply press button 125-1—also indicated in red—to select that function. As described above, if an interactive application presents less than five functions on the display for selection by the user, then correspondingly navigational button arrangement 125 may be controlled in accordance with the principles of the invention to show all the colors or, instead, only show those colors corresponding to the available interactive application functions. For example, if an interactive application only displays a red function key, then navigational button arrangement 125 may be controlled to show all of the colors (red, blue, yellow, green and purple) or, instead, navigational button arrangement 125 may be controlled such that only button 125-1 is lit with the color red. In this latter case, it is assumed that function key information is provided by the interactive application to DTV processor 110.

Figure 8:
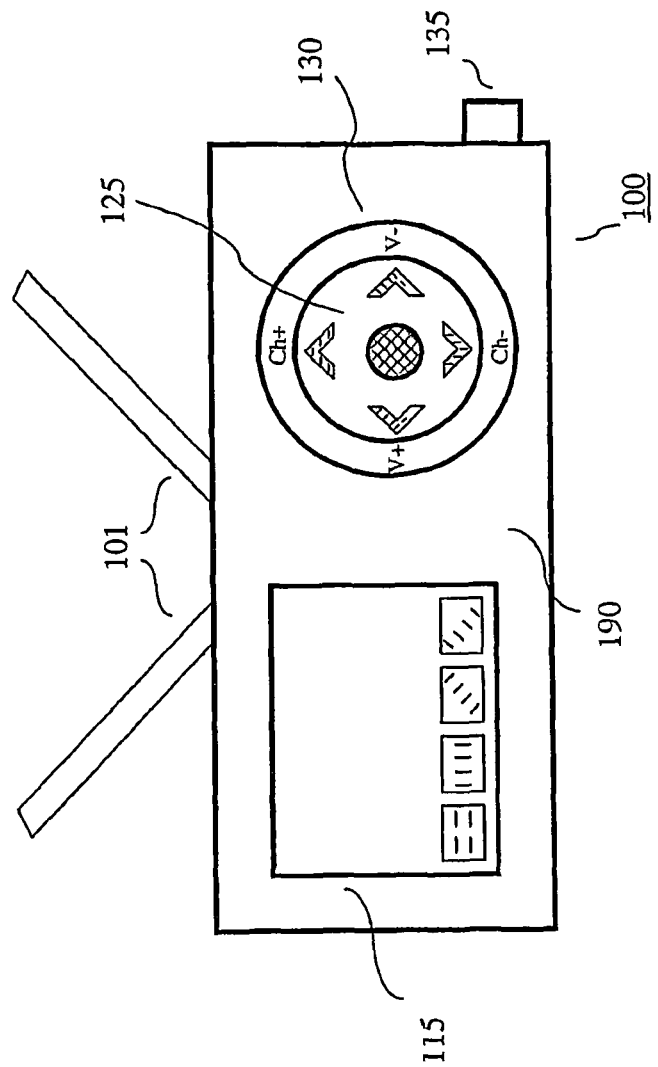
Figure 9:
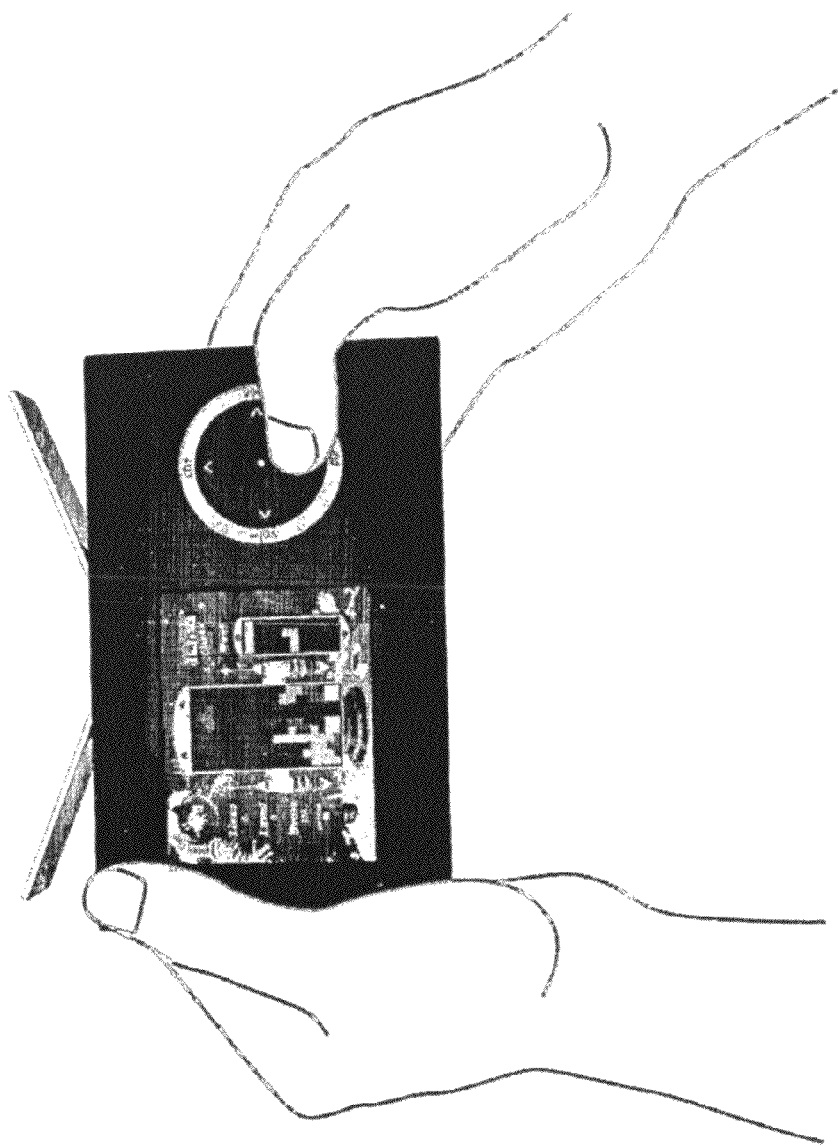
FIGS. 9 and 10 show other views of portable DTV 100 in the navigational mode and interactive application (chromatic) mode.
Figure 10:
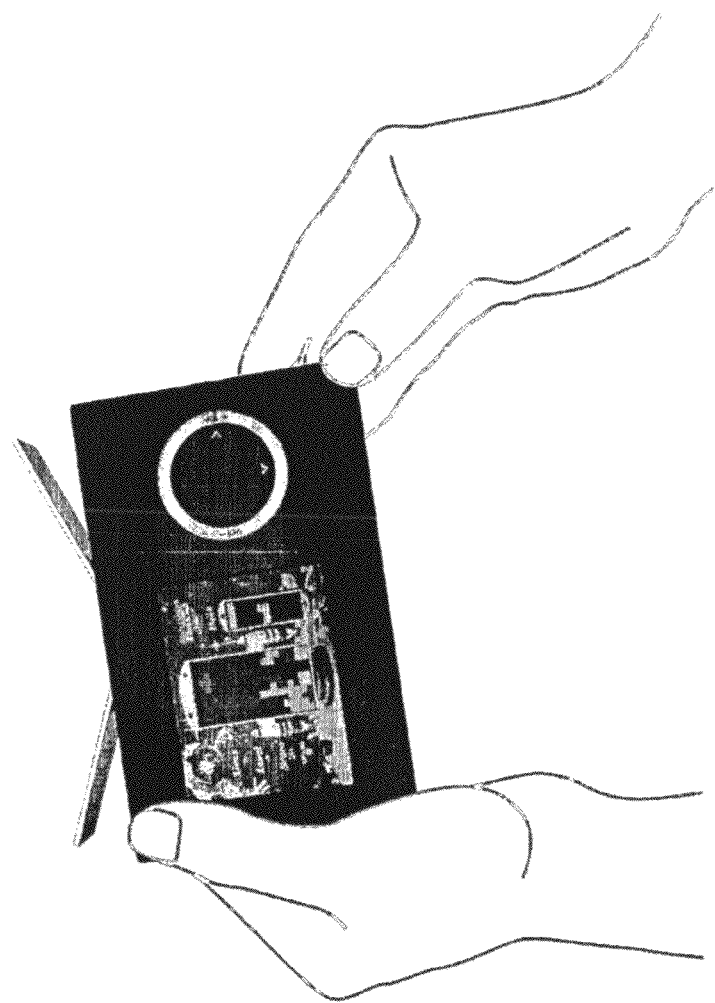

Another illustration of a front view of portable DTV 100 in the interactive application mode is shown in FIG. 8. Likewise, illustrations of user operation are shown in FIGS. 9 and 10 for the navigational mode and the interactive application mode, respectively. It should be noted that these figures are black and white reproductions of color images.

Figure 11:
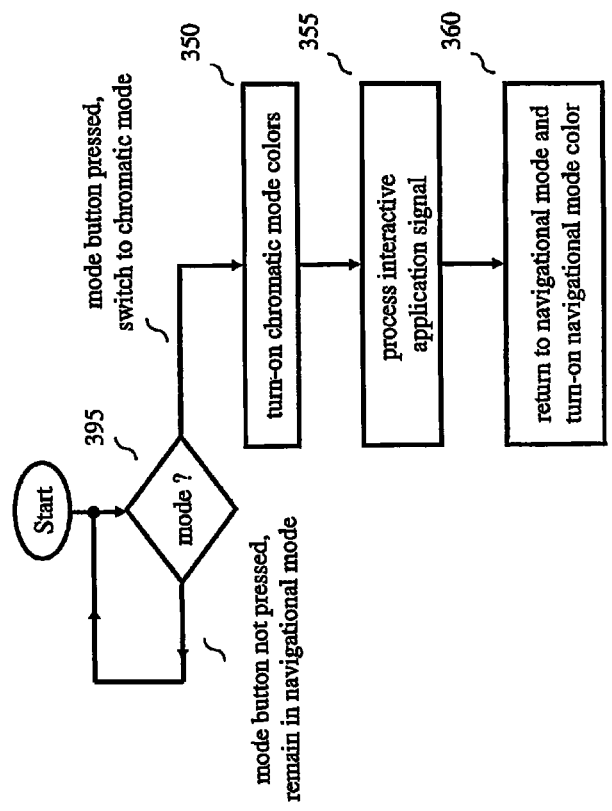
FIG. 11 shows another illustrative flow chart in accordance with the principles of the invention.

Turning now to FIG. 11, another illustrative flow chart in accordance with the principles of the invention is shown. This is an alternative method for configuring portable DTV 100 in either the navigational mode or the interactive application mode. In this example, portable DTV 100 operates in a "sticky mode." In this sticky mode, portable DTV 100 is always in the navigational mode and only switches to the interactive mode for one key (button) press via, e.g., use of mode button 135. In particular, in step 395, portable DTV 100 checks the state of mode button 135 (e.g., via the use of a polling technique or via the use of an interrupt). If mode button 135 has been pressed, then portable DTV 100 enters the interactive application mode in step 350 and turns on the interactive mode colors. In step 355, portable DTV 100 processes the next key stroke on navigational button arrangement 125 in the interactive application mode. Once the next key stroke has been received, portable DTV 100 returns to the navigational mode in step 360 and turns on the navigational mode colors. It should be noted that the method of FIG. 11 can be further modified to include, e.g., a "time out" feature such that if the user does not press a button within a defined period of time while in the interactive application mode then portable DTV 100 reverts back to the navigational mode.

As described above, and in accordance with the principles of the invention, a navigational button arrangement is used in at least two modes of operation: a navigational mode of operation and an interactive application mode of operation. Thus, only four (if purple is not used) or five buttons are needed thereby reducing the amount of physical space required for a user interface on a portable digital TV. As such, the physical size of a portable DTV may be capable of further reduction since even less space is required for the user interface.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although shown as separate elements, any or all of the elements may be implemented in one or more integrated circuits (ICs) such as, e.g., a stored-program-controlled processor, e.g., a digital signal processor (DSP) or microprocessor that executes associated software, e.g., corresponding to one or more of the elements shown in FIG. 1, etc. Further, although described in the context of a portable digital television the inventive concept is also applicable to a remote control for a digital television, etc. Likewise, although a mode button was illustrated in the above description, other methods and mechanisms of setting the mode of the navigational button arrangement may be used. It is therefore to be understood that numerous modifications may be made to the illustrative embodiments and that other arrangements may be devised without departing from the spirit and scope of the present invention as defined by the appended claims.

The invention claimed is:

1. A digital television, comprising:
   a navigational button arrangement arranged to provide a navigational interface to a user and including first, second, third, and fourth buttons having a bimodal operation; and including first, second, third, and fourth optical elements for respectively displaying colors of light on the first, second, third, and fourth buttons;

wherein, in one mode of operation, the first, second, third, and fourth buttons provide a navigational mode for traversing a graphical user interface presented on the digital television and, in another mode of operation, the first, second, third, and fourth buttons provide an interactive application mode enabling initiation of different interaction application programs having respective different associated interaction application functions for interacting with a particular digital television application being currently presented to the user on the digital television;

wherein, in the navigational mode, the first, second, third, and fourth optical elements are turned on to emit light of a first color and, in the interactive application mode, if the first, second, third, and fourth optical elements are turned on to emit respective lights, the respective lights are of second, third, fourth, and fifth colors, wherein the digital television displays up to four different interactive application functions, each different interactive application function associated with a different color selected from the second, third, fourth, and fifth colors and correlated with a respective one the first, second, third and fourth buttons emitting the associated one of the second, third, fourth and fifth colors in the interactive application mode; and wherein among the optical elements, only those optical elements that emit same colors associated with said displayed interactive application functions are turned on, others of the optical elements are turned off.

2. The digital television of claim 1, wherein the digital television is a portable digital television.

3. The digital television of claim 1, further comprising a remote control unit housing the navigational button arrangement.

4. The digital television of claim 1, wherein the first color is white and the second, third, fourth, and fifth colors are red, yellow, blue and green, respectively.

5. A portable digital television, comprising:
a processor;
at least four buttons, arranged to provide a navigational interface to a user; and
optical elements associated with each of the at least four buttons;
wherein the processor controls the at least four buttons such that in a first mode of operation, the at least four buttons provide the navigational interface to the user and, in a second mode of operation, the at least four buttons provide an interactive application interface to the user enabling initiation of different interactive application programs having respective different associated interactive application functions for interacting with a particular digital television application being currently presented to the user on the portable digital television;
wherein, in the first mode of operation, the processor causes the optical elements associated with the at least four buttons to be turned on to provide light of a first color indicative to the user of the first mode of operation and, in the second mode of operation, the processor causes at least one of the optical elements associated with the at least four buttons to be turned on to provide light of a different color indicative to the user of the second mode of operation, wherein the different color is representative of an interactive application function;
wherein if the optical elements associated with the at least four buttons are turned to provide respective lights, the respective lights are of second, third, fourth, and fifth colors,
wherein the portable digital television displays up to four different interactive application functions, each different interactive application function associated with a different color selected from the second, third, fourth, and fifth colors and correlated with a respective one the first, second, third and fourth buttons emitting the associated one of the second, third, fourth and fifth colors in the interactive application mode; and
wherein among the optical elements, only those optical elements that emit same colors associated with the displayed interactive applications are turned on, others of the optical elements are turned off.

6. The portable digital television of claim 5, further comprising a mode button that enables the user to cause the processor to switch between the first mode of operation and the second mode of operation.

7. The portable digital television of claim 5, wherein the optical elements are bicolor light emitting diodes.

8. The portable digital television of claim 5, wherein any optical elements associated with a particular button are adjacent thereto.

9. The portable digital television of claim 5, wherein the second, third, fourth, and fifth colors are red, green, blue and yellow, respectively.

10. The portable digital television of claim 5, wherein the first color is white.

11. A portable television comprising:
a navigational button arrangement for use in traversing a graphical user interface presented on the portable television, the navigational button arrangement comprising at least an:
up button;
down button;
left button;
right button; and
a select button; and
a number of optical elements such that first, second, third, and fourth optical elements are respectively associated with the up, down, left, and right buttons; and
wherein the up, down, left, and right buttons of the navigational button arrangement operates in at least two modes, the at least two modes comprising a navigational mode and a chromatic mode, wherein in the navigational mode, optical elements associated with the up, down, left, and right buttons are turned on to provide light of a first color and, in the chromatic mode, if the optical elements associated with the up, down, left, and right buttons are turned on to provide respective lights, the respective lights are of second, third, fourth, and fifth colors such that four of the buttons are associated with a different one of the four colors
wherein the portable digital television is capable of displaying up to four different interactive application functions, each different interactive application function associated with a different color selected from the second, third, fourth, and fifth colors and correlated with a respective one the first, second, third and fourth buttons emitting the associated one of the second, third, fourth and fifth colors in the interactive application mode; and
wherein among the optical elements, only those optical elements that emit same colors associated with the displayed interactive applications are turned on, others of the optical elements are turned off,

12. The portable television of claim 11, wherein the second, third, fourth, and fifth colors are red, green, blue and yellow, respectively.

13. The portable television of claim 11, wherein the first color is white.

14. A method for use in a digital television, the method comprising:
- (a) setting a first mode for a navigational button arrangement including a plurality of buttons;
- (b) causing a first color to be displayed on the plurality of buttons of the navigational button arrangement, wherein in the first mode, the plurality of buttons of the navigational button arrangement are used to traverse a graphical user interface presented on the digital television;
- (c) setting the navigational button arrangement to a second mode; and
- (d) causing at least four different colors to be displayed on the plurality of buttons of the navigational button arrangement such that each of the plurality of buttons is associated with a different one of the four colors; wherein in the second mode, the plurality of buttons of the navigational button arrangement is used to initiate different interactive application programs having different associated interactive application functions to interact with interactive applications presented on the digital television, and wherein each of the four different colors are associated with a different interactive function, and correlated with a respective one the plurality of buttons emitting the associated different color in the interactive application mode, and wherein each interactive application simultaneously presented on the digital television has a different color selected from the four colors and if one color is missing in presented interactive applications, said missing color is not displayed on the plurality of buttons.

15. The method of claim 14, wherein the digital television comprises a mode button having at least two states, one state associated with the first mode and the second state associated with the second mode and further comprising the step of determining the state of the mode button such that when the state associated with the first mode is detected, steps (a) and (b) are performed and when the state associated with the second mode is detected steps (c) and (d) are performed.

16. The method of claim 14, further comprising the step of:
- (e) returning to step (a) upon selection of a button by a user.

17. The method of claim 14, wherein the four different colors are red, green, blue and yellow.

18. The method of claim 14, wherein the first color is white.

19. The digital television of claim 1, wherein the first, second, third and fourth optical elements emitting lights having respective second, third, fourth and fifth colors in the interactive mode reverts to emitting the light of the first color in the navigation mode after a predefined amount of time.

20. The digital television of claim 1, wherein in response to selection of one of the first, second, third and fourth optical elements emitting lights of the second, third, fourth and fifth colors, in the interactive application mode, the first, second, third and fourth optical elements automatically caused to revert back to the navigation mode and emit light of the first color.

* * * * *